United States Patent
Shores

[11] Patent Number: 5,226,341
[45] Date of Patent: Jul. 13, 1993

[54] HANDLEBAR KIT USING BICYCLE U-LOCK

[76] Inventor: Wade D. Shores, 2300 E. Franklin Ave., #110A, Minneapolis, Minn. 55406

[21] Appl. No.: 889,507

[22] Filed: May 27, 1992

[51] Int. Cl.⁵ .................. B62K 21/12; B62J 11/00
[52] U.S. Cl. ...................... 74/551.8; 74/551.1; 70/233; 224/30 A; 224/31; 224/41; 280/288.4
[58] Field of Search ............. 70/18, 31, 51, 226, 70/227, 233, 234, 258; 74/551.1, 551.8; 224/30 A, 31, 41; 280/288.4, 297

[56] References Cited

U.S. PATENT DOCUMENTS

| | | | |
|---|---|---|---|
| 1,448,921 | 3/1923 | Ershkowitz | 74/551.8 |
| 3,289,493 | 12/1966 | Church | 74/551.8 |
| 3,924,426 | 12/1975 | Zane et al. | 70/18 |
| 3,967,475 | 7/1976 | Zane | 70/18 |
| 5,033,325 | 7/1991 | Giard, Jr. | 74/551.1 X |
| 5,133,568 | 7/1992 | Balterman | 74/551.8 X |
| 5,138,901 | 8/1992 | Dabandjian et al. | 74/551.1 X |
| 5,163,339 | 11/1992 | Giard, Jr. et al. | 74/551.8 X |

OTHER PUBLICATIONS

Brochure from Profile for Speed, Inc., ©1990.

Primary Examiner—Leslie A. Braun
Assistant Examiner—David E. Henn
Attorney, Agent, or Firm—James W. Miller

[57] ABSTRACT

A second set of handlebars in the nature of Aero handlebars is provided on a bicycle using a bicycle U-lock of the type often used to lock the bicycle as the second set of handlebars. The U-lock has a lock body with spaced apart legs. A bracket assembly releasably clamps the U-lock to the normal transverse, first set of handlebars such that the legs of the lock body extend forwardly from the first set of handlebars similarly to a set of Aero handlebars. The U-lock and bracket assembly can be sold together as a complete kit, or the bracket assembly can be sold separately as a kit for use with a U-lock already owned by the bicycle user.

15 Claims, 1 Drawing Sheet

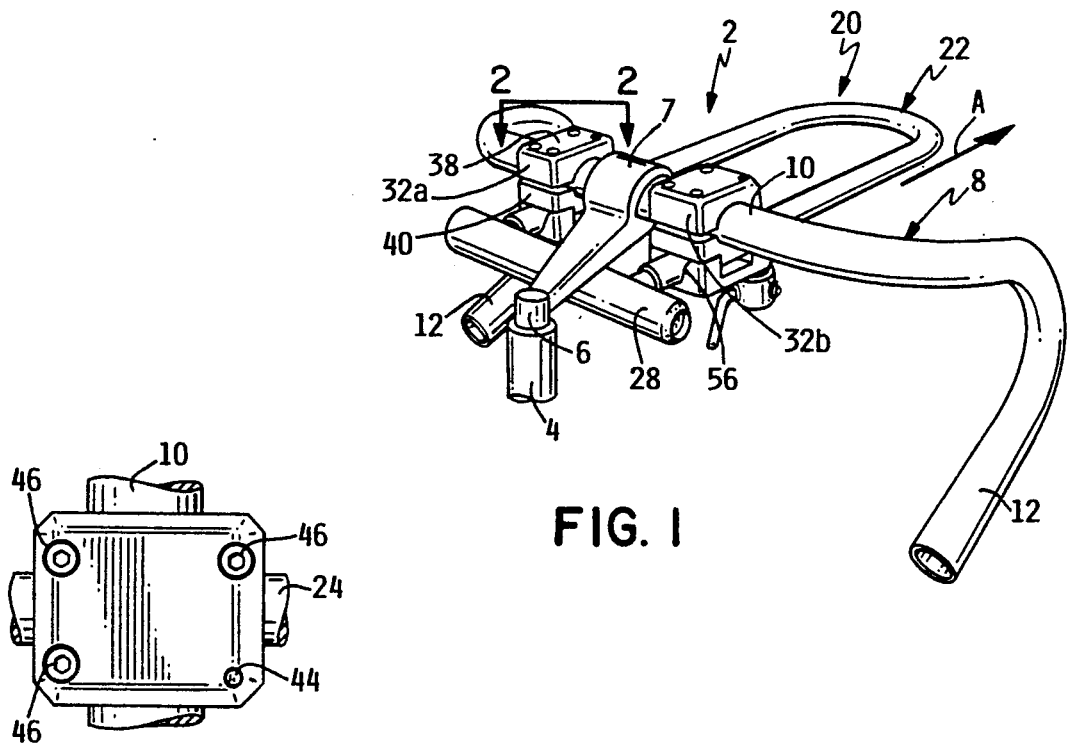
FIG. 1
FIG. 2
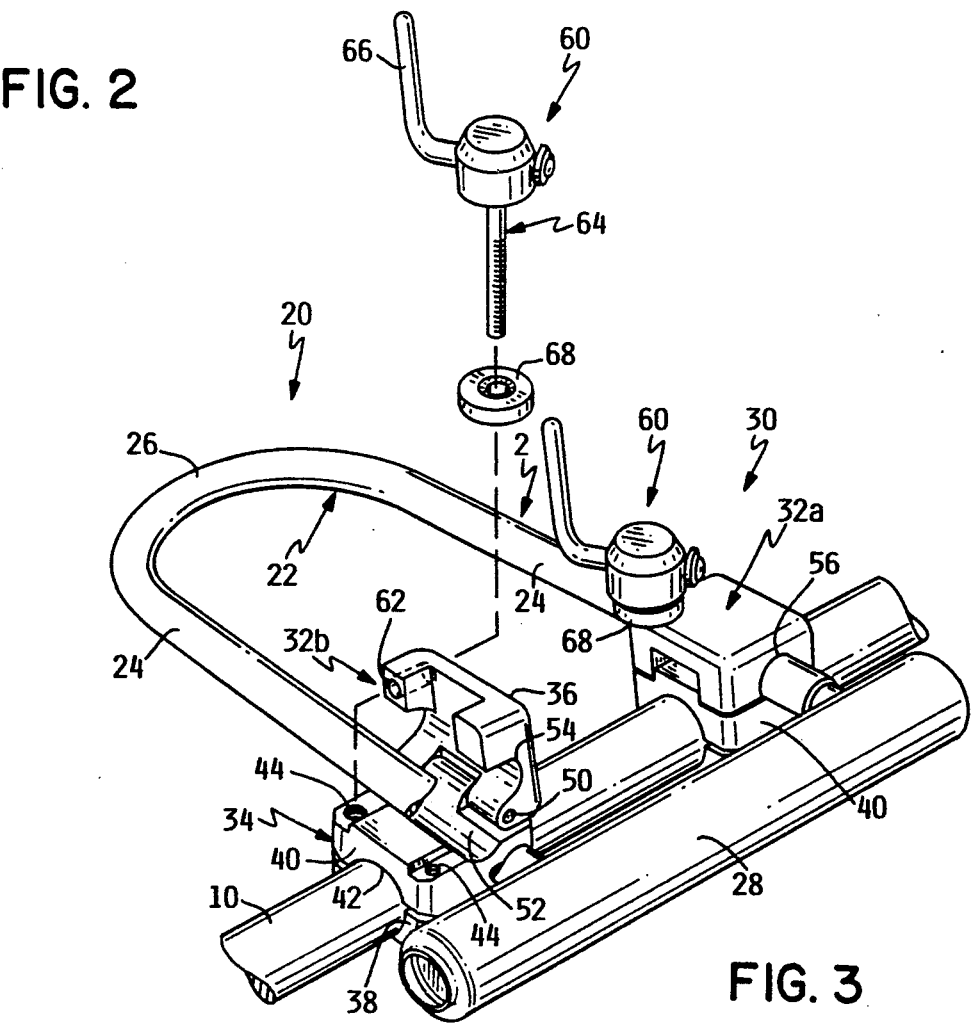
FIG. 3

HANDLEBAR KIT USING BICYCLE U-LOCK

TECHNICAL FIELD

The present invention relates to a method and a kit for providing a second set of handlebars on a bicycle. More particularly, the present invention relates to a kit that uses a typical bicycle U-lock and a novel bracket assembly to form the second set of handlebars. The bracket assembly mounts the U-lock on the bicycle in the manner of a set of forwardly extended Aero handlebars.

BACKGROUND OF THE INVENTION

Bicycle U-locks are well known for helping the owner of a bicycle prevent theft. Such locks are sold under various brand names. Kryptonite is one well-known brand name for such a lock.

A typical bicycle U-lock comprises a U-shaped body having a locking member which extends across the open ends of the legs of the body. The locking member has an internal, key-operated lock to allow the user to selectively remove or install the locking member from the body. When the locking member is removed, so that the lock is in two pieces, the lock body can be slipped around a frame portion of the bicycle and a stationary object, such as a post or stanchion. The locking member can then be replaced across the open end of the body to lock the bicycle in place. The U-lock is made from a durable and hard material, such as a hardened steel, to prevent the lock from being easily cut off the bicycle.

It is inconvenient to store or carry a U-lock on a bicycle. Some U-locks are sold with clamps that attach the lock on one of the frame members of the bicycle, e.g. either on the top tube or the down tube of the frame. Whenever the user stops the bicycle, the lock has to be released from these clamps to allow it to be used to lock the bicycle and then replaced after use. Because of the inconvenience of clamping and unclamping the U-lock each time, the U-lock is not typically carried in these clamps. Many bicyclists simply carry the U-lock in a pack or bicycle bag. However, this is also inconvenient and awkward to do.

A recent innovation in bicycle design is the use of Aero handlebars. Such handlebars have a generally U-shaped configuration and are mounted to the existing handlebars of the bicycle for use as a second set of handlebars. Typically, Aero handlebars are oriented to extend forwardly from the existing handlebars of the bicycle. The rider can lean forwardly and hold the Aero handlebars which helps the rider maintain a tucked position. Thus, the known Aero handlebars are primarily used for increasing performance and speed, but they also conveniently provide another set of handlebars to allow the average rider to vary his hand and body positions while riding.

Known Aero handlebars are provided with a bracket system which attach the handlebars directly to the existing handlebars on the bicycle. Typically each leg of the Aero handlebar will have a bracket that includes a transverse aperture received on the existing handlebars. During normal use of the Aero handlebar system, the Aero handlebars are relatively permanently affixed to the bicycle. While such handlebars could theoretically be removed from the bicycle by unbolting the mounting brackets, this is not typically done very often due to the inconvenience in doing so. Accordingly, one desiring to use Aero handlebars would typically buy a set of such handlebars and mount those bars on the bicycle in a permanent fashion without removing the handlebars each time a particular ride is finished.

SUMMARY OF THE INVENTION

The present invention relates to a method, a kit and a bracket assembly for providing a second set of handlebars on a bicycle in the nature of Aero handlebars using the typical U-shaped lock used to lock the bicycle as the second set of handlebars.

Thus, the present invention comprises a method of providing a second set of handlebars on a bicycle in addition to the first, generally transverse set of handlebars normally provided on the bicycle. The method comprises providing a U-lock of the type used to secure the bicycle to an object. The U-lock comprises a generally U-shaped lock body having spaced apart, elongated legs connected together at one end and being open at the other end, and a locking member releasably secured across the open ends of the legs. The locking member can be selectively removed from the legs to open the lock to install the lock body on the bicycle and can be selectively locked in place across the open ends of the legs after the lock body has been installed around a portion of the bicycle to lock the bicycle in place. The method further comprises releasably mounting at least the lock body of the U-lock on the bicycle in a storage position, wherein the lock body in its storage position on the bicycle is arranged to extend forwardly from the first set of handlebars to allow the lock body to itself form the second set of handlebars which extend forwardly from the first set of handlebars. Finally, the method includes selectively removing the lock body from the storage position when desired to use the U-lock to secure the bicycle.

BRIEF DESCRIPTION OF THE DRAWINGS

The present invention will be described hereafter in the Detailed Description, taken in conjunction with the following drawings, in which like reference numerals refer to like elements or parts throughout.

FIG. 1 is a perspective view of a handlebar kit according to the present invention, particularly illustrating a bicycle U-lock used as part of a kit for forming a second set of handlebars on a bicycle and the bracket assembly for clamping the U-lock in place, the kit being shown in an installed configuration;

FIG. 2 is a top plan view of a portion of the bracket assembly for the handlebar kit shown in FIG. 1, taken along lines 2—2 in FIG. 1, particularly illustrating one of the brackets of the bracket assembly; and FIG. 3 is an enlarged perspective view of the handlebar kit shown in FIG. 1, particularly illustrating the bracket means and U-lock from a position beneath the first set of handlebars looking upwardly and showing one of the brackets in a pivotally open position.

DETAILED DESCRIPTION

Referring first to FIG. 1, the present invention relates to a handlebar kit for use on a bicycle and to the method of using such a kit and the components of the kit. This handlebar kit is generally illustrated as 2 in the drawings. Kit 2 is meant for use on any conventional bicycle whether a road bike, a racing bike, a recreational bike, a mountain bike, or the like. Typically, all bicycles have a frame that includes a down tube 4 for receiving a vertical handlebar stem 6. Stem 6 includes a forwardly extending clamp 7 which grips a first set of handlebars 8 such that stem 6 rotatably mounts handlebars 8 on the bicycle to allow handlebars 8 to be rotated for steering purposes.

Handlebars 8 are oriented transversely across the bicycle and include a transverse, horizontal tube 10 with two grip portions 12 on either side of tube 10. Grip portions 12 are located on opposite sides of the frame of the bicycle to allow the rider to grip and hold handlebars 8 to control the bicycle while riding. While handlebars 8 as shown in FIG. 1 have downwardly turned grip portions 12 in the manner of a road bike or racing bike, the grip portions need not necessarily be formed that way. For example, the horizontal tube 10 on a mountain bike simply extends straight across without being turned down at the ends. Thus, the nature of the bicycle on which the present invention is used, and the precise shape of the first set of handlebars 8, is not important to the present invention as long as a first set of handlebars 8 is present on the bicycle.

Kit 2 of the present invention provides a second set of handlebars on the bicycle, similar in shape and location to Aero handlebars, using a bicycle U-lock 20 of the type often used for locking the bicycle up. One typical form of lock 20 is illustrated in FIG. 3.

Lock 20 comprises a U-shaped lock body 22 having spaced apart, parallel legs 24. Legs 24 are connected together at one end by a curved section 26 to form the U-shape of lock 20 with legs 24 terminating at the other end in free outer ends. A transverse locking member 28 is releasably secured across the free ends of legs 24 of body 22 to complete lock 20. Locking member 28 includes an internal key-operated lock for releasably securing locking member 28 to lock body 22. The structure and operation of such U-locks 20 is generally well known in the prior art (e.g. a Kryptonite lock) and need not be more specifically described herein.

No claim is made by the present invention to the structure or operation of lock 20 per se.

Kit 20 also includes a bracket assembly 30 for releasably securing lock 20 to the bicycle, and specifically to handlebars 8. This bracket assembly 30 includes generally identical left and right brackets 32a and 32b. Because brackets 32a and 32b are identical, a description of one will suffice to describe the other as well.

Each bracket 32 includes a fixed bracket member 34 which is rigidly secured to the existing handlebars 8 and a moveable bracket member 36 which can be moved towards and away from fixed bracket member 34 as will be described hereafter. Fixed bracket member 34 comprises top and bottom bracket halves 38 and 40 which form a transversely extending aperture 42 that receives handlebar tube 10 when the top and bottom bracket halves 38 and 40 are bolted together on opposite sides of tube 10. See FIG. 3. The first and second bracket halves 38 and 40 are provided with a set of four threaded mating bores 44. Three of these bores 44 receive machine bolts 46 or the like for clamping bracket halves 38 and 40 together. The fourth mating bore is left open for a purpose to be described hereafter. When bolts 46 are tightened down, fixed bracket member 36 will be fixedly secured to handlebars 8 as shown in FIGS. 1 and 3.

The moveable bracket member 36 is hinged on fixed bracket member 34 for rotation about a generally longitudinal pivot axis 50. The underside of fixed bracket member 34, namely the underside of bottom bracket half 40, includes a slight arcuate recess 52 which is shaped to mate with an arcuate recess 54 in the pivotal bracket member 36. When the pivotal bracket member 34 is swung from the open position shown by the leftmost bracket in FIG. 3 to the closed position shown in the other bracket in FIG. 3, recesses 52 and 54 will mate and form a longitudinal clamping aperture 56 which is parallel to the longitudinal direction of the bicycle and is perpendicular to the direction of handlebar tube 10. Aperture 56 is sized to receive one of the legs 24 of lock 20 in a relatively close fit.

A clamping means 60 is provided for clamping the moveable bracket member 36 against fixed bracket member 34 to clamp lock 20 in place. As shown in FIG. 3, one way of doing this is to provide a threaded bore 62 in pivotal bracket member 34 which bore 62 is adapted to be aligned with the open one of the threaded bores 44 on fixed bracket member 34 when pivotal bracket member 36 is swung closed. An elongated, threaded clamping rod 64 having a handle 66 extends downwardly through the aligned bores 44 and 62. Handle 66 on rod 64 can be used to screw rod 64 down into place to tightly force or clamp pivotal bracket member 36 against fixed bracket member 34. In this regard, a thrust washer 68 can be used to help distribute the force of rod 62 against pivotal bracket member 36. In any event, after rod 64 is fully tightened, pivotal bracket member 36 will be tightly clamped against fixed bracket member 34 to compress aperture 56 firmly around legs 24 of lock 20 to rigidly hold lock 20 in place.

The installation and operation of kit 2 will now be described. The left and right brackets 32a and 32b are mounted in a fixed manner to the horizontal tube 10 of the existing set of handlebars 8. This is done by disassembling the top and bottom bracket halves 38 and 40 from one another, placing bracket halves 38 and 40 on opposite sides of tube 10, and then bolting bracket halves 38 and 40 together using three bolts 46 extending through three sets of the bores 44. As shown in FIG. 1, brackets 32a and 32b are mounted to tube 10 on opposite sides of handlebar stem 6 with the brackets being spaced apart such that the transverse distance between the clamping apertures 56 is equal to the transverse spacing of legs 24 of lock 20. Legs 24 of lock 20 can then be inserted into apertures 56 and the pivotal bracket members 36 swung closed to capture lock 20 between the fixed and moveable bracket members 34 and 36. The moveable bracket members 36 can then be tightened against the fixed bracket members 34 using clamping rods 64.

When brackets 32a and 32b are installed in this fashion and lock 20 is clamped between the fixed and moveable bracket members, they provide a means for removably mounting lock 20 to the bicycle in a storage position which allows lock 20 to serve as a second, forwardly extending set of handlebars. In this position, as shown in FIGS. 1 and 3, the body 22 of lock 20 extends forwardly in front of handlebar tube 10 with the closed end 26 of lock body 22 being located well in front of tube 10. Brackets 32 are positioned between the closed end 26 of lock body 22 and locking member 28, i.e. the legs 24 of lock body 22 extend through brackets 32 with the locking member 28 being secured to the legs 24 on the back side of brackets 32. Preferably, brackets 32 are shaped to extend below tube 10 so that lock 20 is also located beneath tube 10.

As shown in FIGS. 1 and 3, lock 20 closely simulates the shape and positioning of an Aero set of handlebars. The rider can easily bend forward and hold onto lock 20, by grabbing either the legs 24 or the closed end 26 of lock body 22, to help maintain a tuck position in the same way as he would use a conventional set of Aero handlebars. Positioning lock 20 below the tube 10 also simulates the usual position of Aero handlebars. This positioning is more comfortable to the rider, but lock 20 can be mounted above handlebar tube 10 as well and still be covered by the present invention.

The advantages of the present invention are apparent to those skilled in the art. One does not have to buy or install a separate set of Aero handlebars, but instead can have their equivalent simply using a typical U-lock of the type often carried on the bicycle anyway. In addition, the present invention also doubles as a convenient way for storing lock 20 while it simultaneously functions as the second set of handlebars. Accordingly, the present invention is far more efficient and cost effective than providing a permanent set of Aero handlebars on the bicycle while also providing simultaneously a separate U-lock for locking the bicycle.

The kit 20 of the present invention allows the user to use the lock 20 when desired to lock the bicycle. Thus, lock 20 is intended to be easily removable from bracket assembly 30 to allow it to be used for its locking function. However, the number of times in which the U-lock is in fact removed, i.e. whether it is removed after every ride or only once in a while, is obviously up to the user.

One way of removably securing lock 20 in place is to use clamping rods 64 to allow the pivotal bracket members 36 to be completely swung open whenever one wishes to put lock 20 therein. For example, the pivotal bracket members 36 of both brackets 32 could be swung to the open position shown in FIG. 3 to allow lock 20 to be placed therein and then the threaded rods 64 would be reinstalled and tightened until lock 20 is clamped in place. Conversely, when the user wishes to release lock 20, rods 64 can be completely removed to allow the pivotal bracket members 36 to swing open with lock 20 then simply dropping downwardly out of brackets 32. In this removal method, lock 20 does not have to be disassembled for removal.

However, another and preferred method of removing lock 20 from brackets 32 would be one in which clamping rods 64 are not completely removed from brackets 32 but are only loosened somewhat, i.e. pivotal bracket members 36 are not swung completely away from fixed bracket members 34 but are moved only a slight distance downwardly away from fixed bracket members 34. This would loosen the grip of brackets 32 on legs 24 to allow lock 20 to slide within clamping apertures 56. The user can then use the key, either before or after the loosening of rods 64, to unlock locking member 28 from lock body 22 and physically remove locking member 28 from lock body 22. With locking member 28 removed, the user can then slide lock body 22 out from brackets 32 by pulling out on the lock body in the direction shown by the arrow A in FIG. 1. Lock 20 will slide out from brackets 32 and can then be used in a known fashion to lock the bicycle in place. The advantage of this latter removal method over the former is that a large degree of motion is not required on rods 64 as pivotal bracket members 36 do not have to be completely opened up.

One possible modification to the present invention is one in which the threaded rods 64 shown in FIG. 3 are replaced with quick release rods of the type normally used to hold a bicycle wheel in place. Such a rod could be permanently affixed to the brackets 32 though the pivotal bracket members 36 would still have to be able to move slightly towards and away from the fixed bracket members 34. The cam arrangement carried on the quick release lever would then be used to simply cam the pivotal bracket members 36 towards or away from the fixed bracket members 34 as the quick release lever is operated. This would with one motion of the quick release lever loosen up the engagement of the pivotal bracket members 36 with the fixed bracket members 34 in the same way that slightly unscrewing the threaded rods 64 a few turns would.

The present invention contemplates that lock 20 and bracket assembly 30 could be sold together in a package as a complete kit. Alternatively, if a bicycle owner already owns a U-lock, he would have to purchase only the bracket assembly 30 to practice the present invention. Thus, the present invention also contemplates that the bracket assembly 30 could be sold in kit form by itself.

Various modifications of the present invention will be apparent to those skilled in the art. For example, the pivotal bracket members 36 are hinged for a pivoting motion relative to the fixed bracket members 34 with the clamping means 60 acting on the opposite side of the pivotal bracket members 36 from the pivot axis 50 to force the pivotal bracket members 36 towards the fixed bracket members 34. However, a pivotal mounting of the bracket members 36 is not required. Bracket members 36 could be mounted relative to the fixed bracket members 34 to move or reciprocate in a straight up and down fashion relative to the fixed bracket members 34. Thus, the scope of the present invention is to be limited only by the appended claims.

I claim:

1. Apparatus for providing a second set of handlebars on a bicycle in addition to a first, generally transverse set of handlebars normally provided on the bicycle, wherein the first set of handlebars includes a transverse, horizontal tube, the second set of handlebars being formed by a U-lock of the type used to secure the bicycle to an object, wherein the U-lock comprises a generally U-shaped lock body having spaced apart, elongated legs connected together at one end and being open at the other end, and a locking member releasably secured across the open ends of the legs, wherein the locking member can be selectively removed from the legs to open the lock to install the lock body on the bicycle and can be selectively locked in place across the open ends of the legs after the lock body has been installed around a portion of the bicycle to lock the bicycle in place, wherein the apparatus comprises:

means for releasably securing the U-lock on the bicycle in a storage position while allowing the U-lock to be removed from the storage position when it is desired to use the U-lock to lock the bicycle, wherein the securing means includes means for mounting the lock body of the U-lock to the bicycle beneath the horizontal tube of the first set of handlebars such that the lock body in the storage position of the U-lock extends forwardly from the first set of handlebars to allow the lock body to itself form the second set of handlebars, and wherein the mounting means is configured to position the locking member of the U-lock proximate to and beneath a portion of the first set of handlebars such that downward force applied by the rider to the lock body when the lock body is being used as the second set of handlebars and the locking member is in place on the lock body will cause an upward movement of the locking member into an abutting engagement with said portion of the first set of handlebars should the lock body become loose in the mounting means, whereby such abutting engagement will prevent further movement of the U-lock relative to the mounting means.

2. Apparatus as recited in claim 1, wherein the mounting means comprising means for clamping the lock body on the first set of handlebars.

3. Apparatus as recited in claim 2, wherein the first set of handlebars comprises a transverse, horizontal tube, and wherein the clamping means clamp the lock body of the U-lock to the horizontal tube of the first set of handlebars beneath the horizontal tube.

4. Apparatus as recited in claim 1, wherein the mounting means comprises a bracket assembly fixed to a portion of the bicycle which bracket assembly includes means for releasably clamping against the lock body, wherein the releasable clamping means has a first position in which it is tightly clamped against the lock body to hold the lock body in place in the bracket assembly and a second position in which it is released from the lock body to allow the lock body to be removed from the bracket assembly.

5. Apparatus as recited in claim 4, wherein the clamping means of the bracket assembly comprises at least one clamping aperture which in the first position of the clamping means is tightly compressed against a portion of the lock body and in the second position of the clamping means is loosened relative to the portion of the lock body to allow the lock body to be slid within the aperture though the aperture is still intact and surrounds the lock body in the second position of the clamping means.

6. Apparatus as recited in claim 5, wherein the bracket assembly comprises two brackets fixed to the bicycle each having a clamping aperture which is suited to be clamped against one of the legs of the lock body.

7. Apparatus as recited in claim 6, wherein the first set of handlebars comprises a transverse, horizontal tube, and wherein the bracket assembly is carried on the horizontal tube of the first set of handlebars.

8. A kit for providing a second set of forwardly extended handlebars on a bicycle, the second set of handlebars when installed being in addition to a first, generally transverse set of handlebars normally provided on the bicycle, wherein the first set of handlebars comprises a rotatable handlebar stem having a forwardly extending clamp that grips a horizontal, transversely extending, handlebar tube portion, which comprises:
 (a) a U-lock having means to secure the bicycle to an object, wherein the U-lock comprises:
  (i) a generally U-shaped lock body having spaced apart, elongated legs connected together at one end and being open at the other end; and
  (ii) a locking member releasably secured across the open ends of the legs, wherein the locking member can be selectively removed from the legs to open the lock to install the lock body on the bicycle and can be selectively locked in placed across the open ends of the legs after the lock body has been installed around a portion of the bicycle to lock the bicycle in place; and
 (b) bracket means attached to the bicycle for mounting the U-lock on the bicycle beneath the horizontal tube portion of the first set of handlebars in a storage position in which the legs of the lock body extend forwardly from and in advance of the horizontal tube portion of the first set of handlebars with the one end of the lock body being spaced in front of the horizontal tube portion of the first set of handlebars and in which the locking member when attached to the legs of the U-lock is located rearwardly of the horizontal tube portion to underlie the clamp on the handlebar stem, whereby the lock body of the U-lock itself forms the second set of handlebars and possible downward movement of the U-lock within the bracket means caused by downward force of the rider on the legs of the U-lock will be prevented by engagement of the locking member against the clamp on the handlebar stem.

9. A kit as recited in claim 8, wherein the bracket mean includes means for fixedly clamping the bracket means to the first set of handlebars.

10. A kit as recited in claim 8, wherein the bracket means includes means for forming two clamping apertures that extend longitudinally relative to the bicycle and perpendicularly relative to the first set of handlebars, wherein each clamping aperture is sized to receive one of the legs of the lock body therein.

11. A kit as recited in claim wherein the bracket means when installed on the first set of handlebars is configured to locate the clamping apertures beneath the horizontal tube portion of the first set of handlebars such that the lock body is carried slightly beneath the first set of handlebars when it is in place and is being used as the second set of handlebars.

12. A kit as recited in claim 10, wherein the clamping aperture forming means is movable between a first position in which the clamping apertures are tightly clamped on the legs of the lock body and a second position in which the clamping apertures are loosened relative to the legs of lock body to allow the lock body to be removed from the bracket means.

13. A kit as recited in claim 12, wherein the bracket means includes two brackets each comprising a fixed bracket member secured to the bicycle and a moveable bracket member carried on the fixed bracket member and being moveable towards and away from the fixed bracket member, and wherein the clamping apertures are formed, respectively, between the fixed and moveable bracket members of each bracket.

14. A kit as recited in claim 13, wherein the moveable bracket member is hinged to the fixed bracket member, and further including selectively operable means for clamping the moveable bracket member against the fixed bracket member.

15. A bracket assembly which may be secured to a first, generally transverse set of handlebars of the type normally provided on a bicycle for mounting a U-lock to the first set of handlebars such that the U-lock extends forwardly from the first set of handlebars generally perpendicularly thereto, wherein the U-lock is of the type having two spaced apart, elongated legs connected together at one end and being open at the other end with a locking member releasably secured across the open ends of the legs, wherein the bracket assembly comprises:
 left and right brackets each of which carries one of the legs of the U-lock, wherein each bracket comprises a fixed bracket member fixedly secured to a horizontal tube portion of the first set of handlebars and a second bracket member which is moveable towards and away from the fixed bracket member, the moveable bracket member and the fixed bracket member forming a longitudinally extending clamping aperture therebetween which clamping aperture is generally perpendicular to the horizontal tube portion of the first set of handlebars and is sized to receive one of the legs of the U-lock therein, and further including selectively operable means for clamping the moveable bracket member of each bracket against the fixed bracket member of the bracket to firmly clamp the legs of the U-lock in the clamping aperture formed between the fixed and moveable bracket members to fixedly mount the U-lock in place, the clamping means being releasable to at least partially separate the first and second bracket members from one another to allow the legs of the U-lock to be released from the brackets and the U-lock removed, wherein the left and right brackets are configured to clamp only the legs of the U-lock with the locking member of the U-lock not being contacted by the brackets when the legs of the U-lock are received in the brackets, and wherein the brackets are further configured to position the locking member of the U-lock proximate to and beneath a portion of the first set of handlebars such that downward force applied to the legs of the U-lock when such U-lock is received in the brackets will cause an upward movement of the locking member into an abutting engagement with said portion of the first set of handlebars should the brackets have a loose fit with the legs of the U-lock, whereby such abutting engagement will prevent further movement of the U-lock relative to the brackets.

* * * * *